US011032766B2

(12) United States Patent
Murali et al.

(10) Patent No.: US 11,032,766 B2
(45) Date of Patent: Jun. 8, 2021

(54) WIRE-FREE BLUETOOTH COMMUNICATION SYSTEM WITH FAST PAIRING

(71) Applicant: Redpine Signals, Inc., San Jose, CA (US)

(72) Inventors: Partha Sarathy Murali, Sunnyvale, CA (US); Subba Reddy Kallam, Sunnyvale, CA (US)

(73) Assignee: Silicon Laboratories Inc., Austin, TX (US)

( * ) Notice: Subject to any disclaimer, the term of this patent is extended or adjusted under 35 U.S.C. 154(b) by 4 days.

(21) Appl. No.: 16/442,446

(22) Filed: Jun. 14, 2019

(65) Prior Publication Data
US 2020/0396681 A1 Dec. 17, 2020

(51) Int. Cl.
| | |
|---|---|
| H04W 52/02 | (2009.01) |
| H04W 52/24 | (2009.01) |
| H04B 17/318 | (2015.01) |
| H04W 4/80 | (2018.01) |
| H04L 9/08 | (2006.01) |
| H04W 84/20 | (2009.01) |
| H04R 1/10 | (2006.01) |
| H04R 5/033 | (2006.01) |
| G10L 19/02 | (2013.01) |

(52) U.S. Cl.
CPC ..... *H04W 52/0219* (2013.01); *G10L 19/0208* (2013.01); *H04B 17/318* (2015.01); *H04L 9/0825* (2013.01); *H04R 1/1016* (2013.01); *H04R 5/033* (2013.01); *H04W 4/80* (2018.02); *H04W 52/0206* (2013.01); *H04W 52/245* (2013.01); *H04W 84/20* (2013.01); *H04R 2460/03* (2013.01)

(58) Field of Classification Search
CPC ................................................. H04W 52/0219
See application file for complete search history.

(56) References Cited

U.S. PATENT DOCUMENTS

| | | | | |
|---|---|---|---|---|
| 10,631,363 | B1 * | 4/2020 | Xian ..................... | H04R 1/1016 |
| 2005/0107084 | A1 * | 5/2005 | Dyck .................... | H04W 28/16 |
| | | | | 455/436 |
| 2013/0295848 | A1 * | 11/2013 | O'Neill ............. | H04W 52/0216 |
| | | | | 455/41.2 |
| 2014/0059347 | A1 * | 2/2014 | Dougherty ............ | H04W 12/06 |
| | | | | 713/168 |
| 2015/0172423 | A1 * | 6/2015 | Wu .................... | H04L 29/06068 |
| | | | | 370/310 |
| 2018/0288705 | A1 * | 10/2018 | Park ...................... | H04L 27/183 |
| 2020/0008176 | A1 * | 1/2020 | Shukair ............... | H04W 52/367 |
| 2020/0252993 | A1 * | 8/2020 | Srivastava ............. | H04W 4/80 |
| 2020/0322788 | A1 * | 10/2020 | Batra .................... | H04W 76/14 |

* cited by examiner

*Primary Examiner* — Jason E Mattis
(74) *Attorney, Agent, or Firm* — File-EE-Patents.com; Jay A. Chesavage

(57) ABSTRACT

A power saving wire-free earpiece has a Bluetooth transceiver and a Bluetooth Low Energy (BLE) transceiver. A stream of audio from a remote source is separated into a local audio stream and a stream sent to the BLE transceiver for a remote earpiece. The earpiece is operative in a first and second mode, the first mode enabling the BT transceiver and BLE transceiver, the second mode enabling only the BLE transceiver for receiving remote streams of data. The first and second mode alternate so that the local and remote earpiece have substantially uniform current requirements.

20 Claims, 10 Drawing Sheets

Wired BlueTooth Earbuds

Wire-free BlueTooth Earbuds

First Mode of Operation

Second Mode of Operation

| (RIGHT) RSSI_REMOTE | (LEFT) RSSI_LOCAL | Device in first Mode |
|---|---|---|
| −91dbm | −60dbm | L |
| −95dbm | −75dbm | L |
| −85dbm | −90dbm | R |
| −80dbm | −85dbm | R |
| −75dbm | −80dbm | R |
| −90dbm | −60dbm | L |

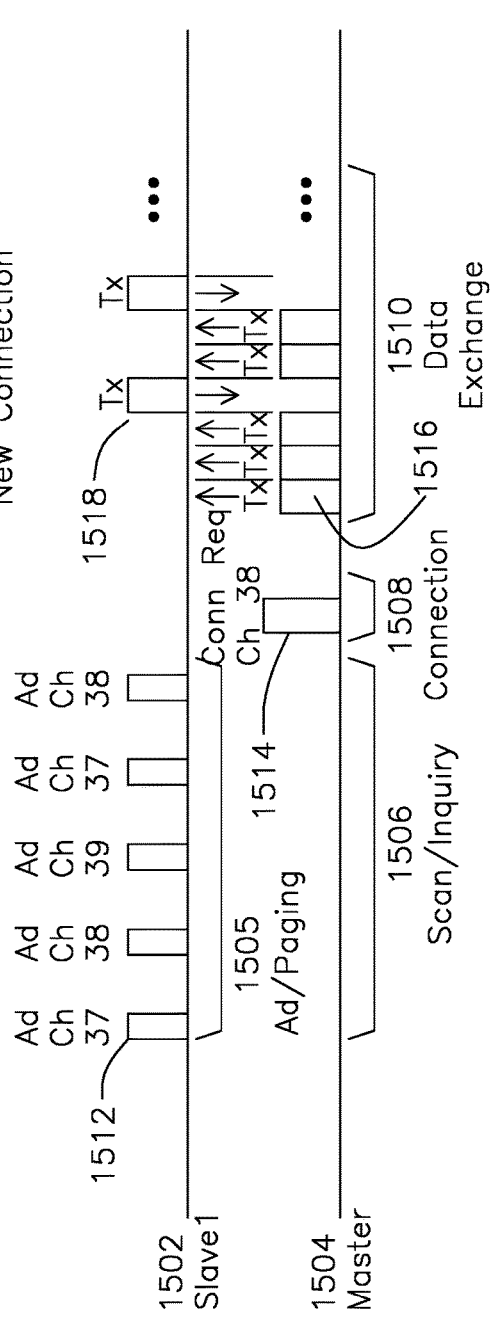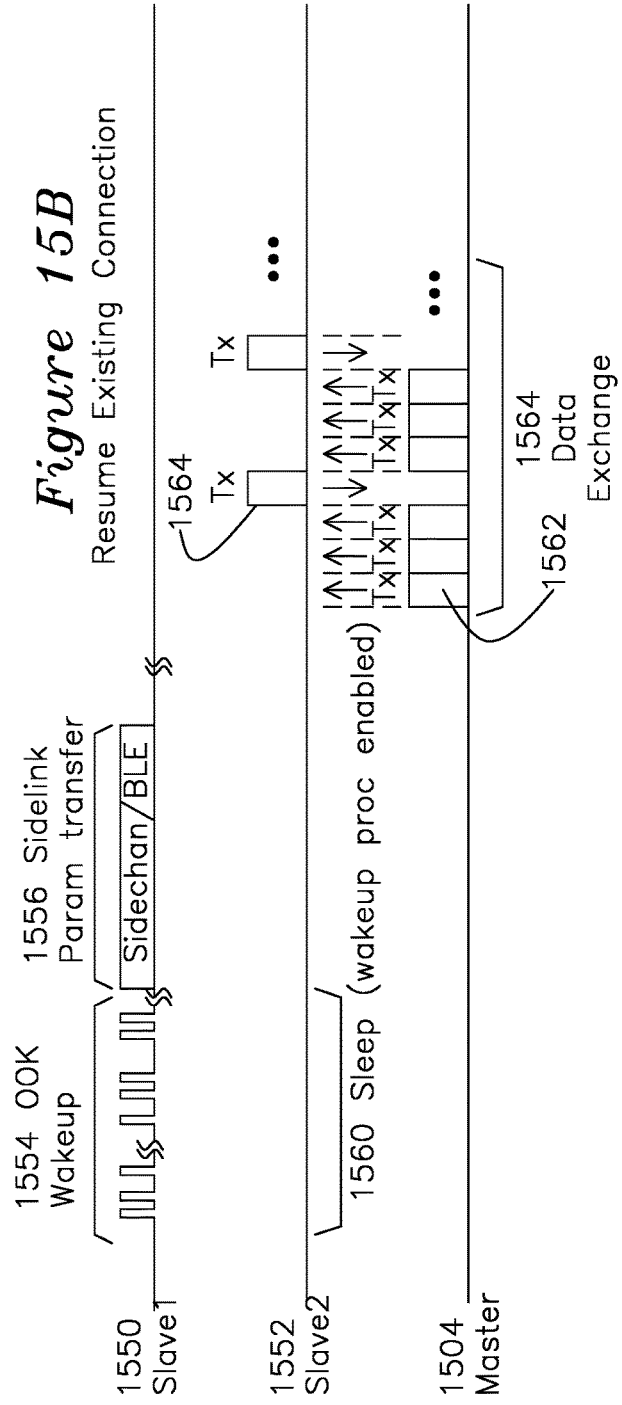

WIRE-FREE BLUETOOTH COMMUNICATION SYSTEM WITH FAST PAIRING

FIELD OF THE INVENTION

The present invention relates to a communications interface for wire-free Bluetooth, where the wireless signal is received by individual earpieces not electrically connected to each other. In particular, the invention relates to a Bluetooth communication system providing balanced power consumption for each earpiece.

BACKGROUND OF THE INVENTION

The Bluetooth protocol provides a transport layer for data communication using a wireless protocol which draws a small amount of power. The Bluetooth protocol supports many different types of transport protocols, each of which is operative using a frequency and/or phase shift keying modulation method. For delivery of audio, samples are digitized and provided to an encoder/decoder (CODEC), the most popular of which is SubBand Coding (SBC), which may be used with the Advanced Audio Distribution Profile (A2DP) and described in the Bluetooth standard. SBC provides support for audio streams with a maximum bit rate of 342 kbps (kilobits per second) for mono and 345 kbps for stereo, with sampling rates up to 48 Khz and using 16 bit samples. Other encodings which may be used include AAC (Advanced Audio Coding) used by YouTube and Apple, aptX which is proprietary to Qualcomm, and LDAC which is proprietary to Sony. The various encodings interoperate with the Audio Visual Remote Control Profile (AVRCP) or service, which adds the remote signaling for "play", "pause", and "skip" functions found on Bluetooth audio devices.

In a typical Bluetooth system, and according to the terminology used in the Bluetooth standard, the host system delivering music content is a "master", and a wearable system receiving the music content is a "slave", and the two channels (Left and Right, or L and R) are delivered together over the Bluetooth encoded audio stream to a wearable receiver which decodes the L and R music streams, and delivers each of them separately to each earpiece. Although this was fully anticipated in the original Bluetooth protocol, there is not a standard mechanism for separately delivering L and R streams to each earpiece to eliminate the interconnecting wire. Apple Computer has recently popularized the wireless AirPod, which provides wireless separate delivery of L and R streams to each AirPod.

In one example wire-free implementation of Bluetooth, a dedicated Bluetooth earpiece receiver terminates the slave end of the Bluetooth connection for one earpiece, and the other earpiece also contains a full Bluetooth receiver which silently "sniffs" Bluetooth packets and delivers the remaining channel to the other earpiece. This approach has the disadvantage of high power consumption of fully functional Bluetooth for both earpieces, and the possibility of loss of loss of packets with the "sniffed" channel (such as L) when the received RF signal is attenuated, as re-transmission requests only occur with the non-sniffing fully Bluetooth terminated earpiece (R in this example).

Another example prior art system terminates both L and R channels with a Bluetooth device, transmits one of the audio stream directly into one ear, and modulates the other audio stream using Near Field Communication (NFC) which may be directly modulated low frequency RF, since RF does not propagate well through human tissue.

It is desired to provide a system for reliable and low-power delivery of audio streams to wire-free earpieces. It is also desired to provide an RF apparatus and method for delivery of multiple audio streams to wire-free earpieces which provides a substantially uniform battery life for each earpiece.

Objects of the Invention

A first object of the invention is a Bluetooth device having a Bluetooth (BT) transceiver and a local sidelink transceiver, the Bluetooth device having a first mode of operation and a second mode of operation, during the first mode of operation, the BT transceiver receiving at least two streams of audio, the BT transceiver forwarding one of the streams to the local sidelink transceiver for transmission and presenting the other stream to a local output, and during the second mode of operation, the local BT transceiver receives a single stream of audio from a remote sidelink transceiver and presents the received audio stream from the local sidelink transceiver as a local output stream of audio, the first mode of operation and second mode of operation being cyclically alternated.

A second object of the invention is a Bluetooth (BT) transceiver having a first mode of operation and a second mode of operation, the first mode of operation enabling power to the BT transceiver and also a sidelink transceiver (such as by use of the BLE physical modulation method or physical layer only), the second mode of operation enabling power to only the sidelink transceiver, the first mode of operation operative to receive from the BT transceiver a data stream having at least two audio streams where one of the audio streams is directed to the sidelink transceiver for transmission over a sidelink transceiver such as a BLE modulation physical layer to a remote device and the other presented locally, the second mode of operation receiving an audio stream from the sidelink transceiver and presenting it as a local audio output.

SUMMARY OF THE INVENTION

A system for wire-free delivery of audio streams to two earpieces has a first and second station, each station having a Bluetooth transceiver and a sidelink transceiver operative as a Low Energy (LE) RF transmitter or receiver. The Bluetooth transceiver may be fully or partially compliant with Bluetooth versions 4.0 or 5.0, and the sidelink transceiver need only communicate a short distance such as from one earpiece to the other earpiece, and the sidelink transceiver may operate using Bluetooth GFSK modulation and/or frequency hopping only at 1 Mbps, 2 Mbps, or 3 Mbps in bursts, and will preferentially draw a fraction of the power consumed by the Bluetooth transceiver of the corresponding station. For a first duration of time in a first mode, Bluetooth packets containing two channels of audio from a master are network terminated by the first BT station, meaning that the Bluetooth transceiver follows the Bluetooth standard for scanning/inquiry, connection, transmission, and acknowledgement of received packets as is well known in the Bluetooth communications protocol. The Bluetooth transceiver is configured to deliver one audio channel to a first earpiece and transmit the other audio channel using its local sidelink station to a second remote sidelink station which receives them. These functions reverse in a second duration of time in a second mode of operation, with the second Bluetooth station terminating the Bluetooth stream from the Bluetooth master, and presenting one channel of audio locally and transmitting the other channel using its sidelink transceiver. The power consumption of the first station in a first mode and power consumption of a second station in a second mode are high compared to the power consumption of a first station in a second mode or the second station in a first mode. Accordingly, alternating the cycles of each station between a first mode and second mode provides approximately equal power consumption between the two earpieces as the roles of a particular earpiece terminating the BT link and transmitting to the sidelink are reversed in each time interval. During the first duration of time, the first BT station (earpiece) has its BT transceiver and sidelink transmitter both enabled, and the second BT station (earpiece) has its sidelink transceiver enabled and BT transceiver disabled. During the second duration of time, the second BT station (earpiece) has its BT transceiver and sidelink transceiver both enabled, and the first station (earpiece) has its sidelink transceiver enabled and BT transceiver disabled.

During each first and second interval of time, packets of audio data are sent from a sidelink transmitter of an earpiece station to a sidelink receiver of the remote earpiece based on the buffering capability of the respective receiver, which may be acknowledged to prevent packet loss and to avoid buffer underflow. Because the separation distance between L and R sidelink transceivers of the earpieces is small, the sidelink transmit/receive connections between L and R may optionally use a proprietary data transfer mechanism, the sidelink transceiver including any of Near Field Induction Communication (NFC), or the Bluetooth Low Energy physical layer, in one example by transmitting audio data at standard BLE rates of 1 Mbps, 2 Mbps, or 3 Mbps, or data rates using the BLE physical layer of 4 Mbps or 8 Mbps.

BRIEF DESCRIPTION OF THE DRAWINGS

FIGS. 15A and 15B show a timing diagram for the operation of FIG. 14 in an example of the invention.

DETAILED DESCRIPTION OF THE INVENTION

Figure 1:
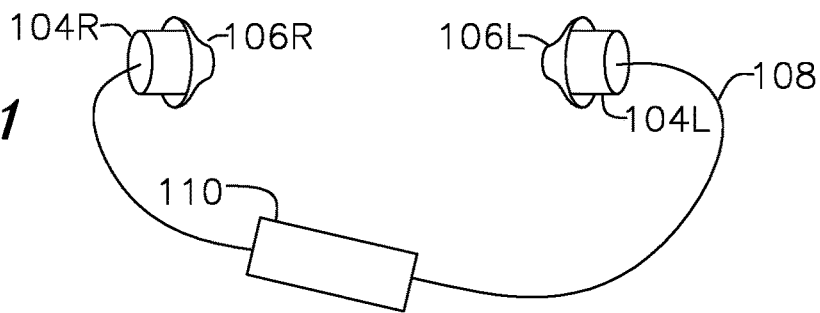
FIG. 1 is a diagram of a prior art wired Bluetooth earpiece set.

FIG. 1 shows a prior art wired Bluetooth (BT) earpiece set 100. A BT receiver 110 receives a BT audio stream from a master Bluetooth device, decodes the audio stream into Left (L) and Right (R) channels of baseband audio, and delivers them to speakers 104R and 104L of earpiece 106R and 106L, respectively.

Figure 2:
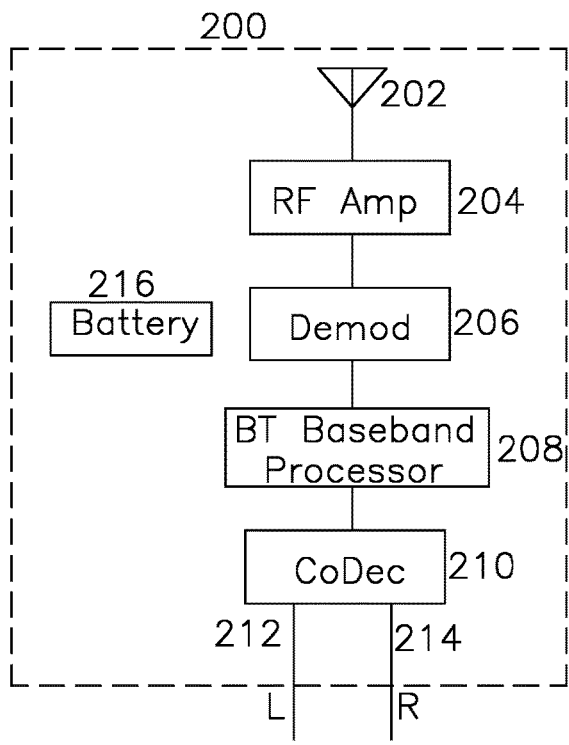
FIG. 2 is block diagram for a Bluetooth receiver suitable for use with the device of FIG. 1.

FIG. 2 shows a BT receiver 200 suitable for use as a receiver 110 of FIG. 1 with additional detail. An antenna 202 receives the BT stream, amplifies 204 the RF, and applies the Bluetooth signal RF frequency or phase shift keying (FSK/PSK) to demodulator 206, thereafter to baseband processor 208, which converts the phase-modulated frequency hopping patterns into data streams, which are delivered to a Code-Decode (Codec) 210 which separates the audio streams into L 212 and R 214. Battery 216 provides power to the various functions, and battery management capabilities (not shown) provide that the battery life for a single charge is maximized.

Figure 3:
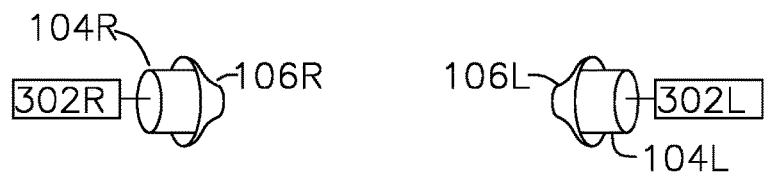
FIG. 3 is a diagram of prior art wire-free Bluetooth earpieces.

FIG. 3 shows prior art wire-free Bluetooth earbuds 300, where the wire between the earbuds is not present, and each earbud 106R and 106L with respective speaker 104R and 104R has a separate Bluetooth receiver 302R and 302L.

Figure 4:
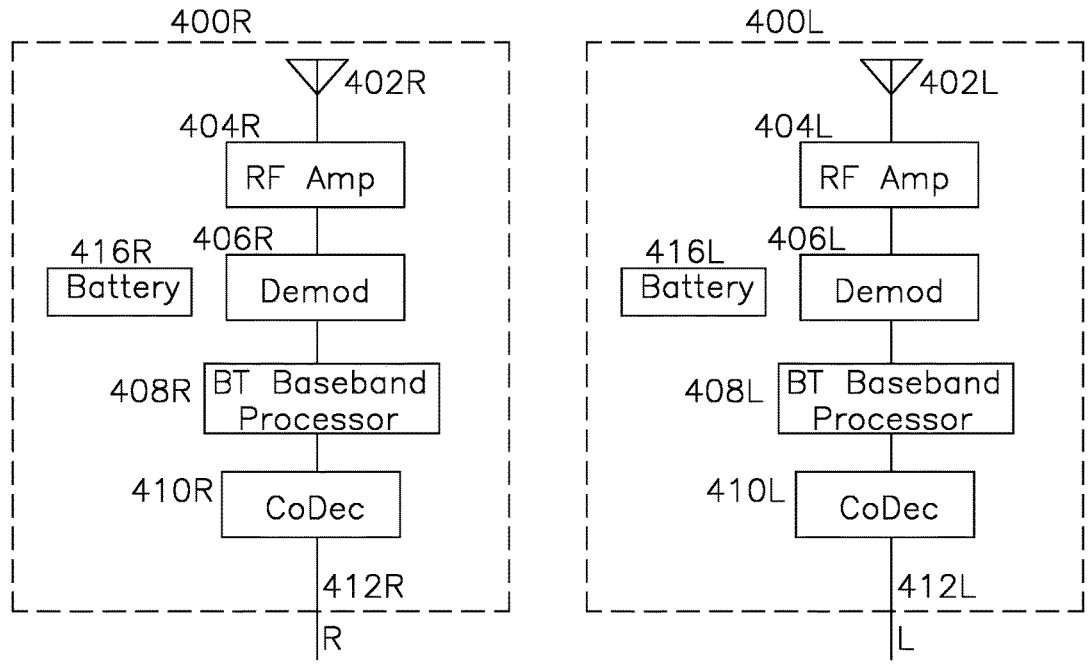
FIG. 4 is a block diagram for a pair of individual R and L wire-free earpiece receivers.

FIG. 4 shows example Bluetooth receivers 400R and 400L which may be used with the wire-free earpieces of FIG. 3. Examining the Right channel 400R, BT signals are received at antenna 402R, amplified 404R, demodulated 406R, and applied to a baseband processor 408R which delivers the data stream to CODEC 410R which separates the channel into R channel 412R. Left channel 302L operates in the same manner, with the codec 410L configured to separate the Left channel rather than the Right of Codec 410R. L and R suffix references in the present application are understood to perform the same functions for their respective audio channels, as previously described.

Figure 5:
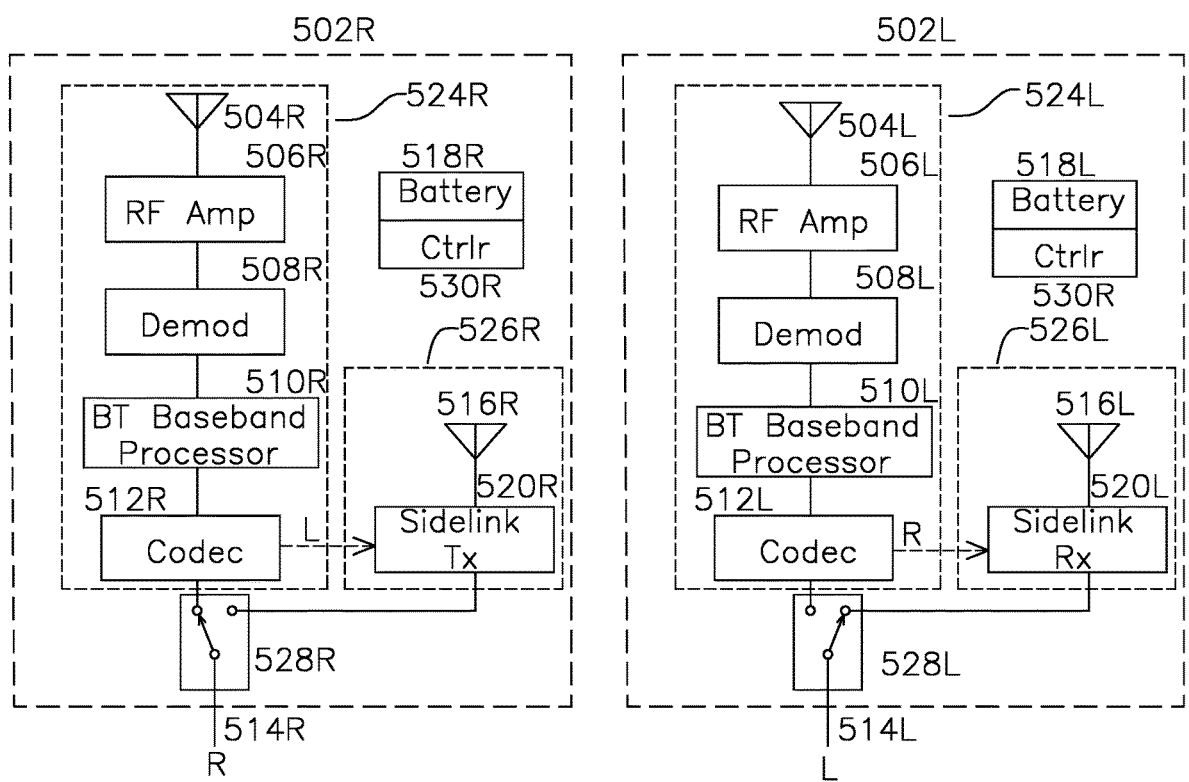
FIG. 5 is a block diagram of an example of the present invention.

FIG. 5 shows an example of the present invention, and will be described with respect to first Bluetooth device 502R (such as a first earpiece receiver), which has a first Bluetooth transceiver 542R and a sidelink transceiver 526R. The Bluetooth transceiver 524R includes an antenna 504R, RF amplifier 506R, demodulator 508R, baseband processor 510R and codec 512R which directs one channel to switch 428R and the other to sidelink transceiver 520R for transmission. In the first mode of operation, Bluetooth transceiver 524R is enabled, its codec 512R generates a first audio stream (such as R), which can be delivered as an output 514R when switch 528R is set to select first BT transceiver 524 output. The second audio stream (such as L) is delivered to the low power sidelink transceiver 520R for transmission via antenna 516R. The sidelink transceiver 526R may use any low power protocol compared to the power requirement of BT transceiver 524R, such as near field induction communications (NFC), or the physical layer of Bluetooth Low Energy at standard data rates or proprietary data rates of 4 Mbps or 8 Mbps. Since the sidelink transceivers 526R and 526L need not interoperate with other communication protocols, they need only provide fidelity of audio transmission and low power consumption. The audio data is transferred in bursts, so higher data rates result in lower total power consumption associated with the shorter bursts of received or transmitted data. In one example of the invention, the sidelink transceiver 526R may use the BLE frequency/phase shift keying modulation method only, preferably at higher than BLE standard data rates to shorten the time the sidelink transceiver is enabled, with buffering of the audio stream from the transmitting channel so that the modulated RF audio packets may be received in a few bursts and buffered to provide continuous audio content. Because the Bluetooth transceiver 524R supports the entire Bluetooth stack for interoperability with the master host, it will necessarily have higher power consumption than the sidelink transceiver 526R. In one example of the invention where the sidelink transceiver 526 is burst transmission of audio packets using BLE modulation, the power consumption of the sidelink transceiver 526R is roughly ⅓ of the BT transceiver 524R. For this example, in the first mode of operation, the current consumption from the Bluetooth radio 524R is approximately 3 ma, and the current consumption from the example BLE sidelink transceiver 526R is approximately 1 mA. The total current consumption for the first station in the first mode of operation (or the second station in the second mode of operation) is accordingly approximately 4 ma.

In a second mode of operation, Bluetooth transceiver 524R is disabled and side band transceiver 526R (such as an example of a BLE sidelink transceiver) remains enabled, receiving a remote stream of BLE audio packets from second device 502L sidelink transceiver 526L, directing the stream of audio to switch 528R, which is set to select the stream from the example sidelink transceiver 526R in the second mode of operation. The current consumption for the example first station sidelink transceiver in the second mode of operation (or second station 502L in the first mode of operation) is approximately 1 ma.

In the second mode of operation, with switch 528R selecting the sidelink transceiver 526R output, the output 514R outputs the Right channel audio stream from the sidelink transceiver 526R while the BT transceiver 524L is receiving the Bluetooth stream from the master, the BT transceiver 524L receiving both L and R audio streams, delivering the Left audio stream via switch 514L selecting the output of codec 512L, and the sidelink transceiver 526L transmitting the R stream for reception by first station sidelink transceiver 526R. The sidelink transceivers 526R and 526L may operate using an acknowledgement and re-transmission protocol to ensure that all transmitted packets are received, or the sidelink transceivers 526R and 526L may operate in a unicast manner without retransmission. In a unicast sidelink transceiver mode without retransmission or acknowledgement, the sidelink transceiver 520R operates primarily as a transmitter in the first mode of operation and as a receiver in the second mode of operation, whereas sidelink transceiver 526L operates primarily as a receiver in the first mode of operation and as a transmitter in the second mode of operation. A configuration mode of operation which precedes the first and second mode of operation enables the communication of Bluetooth parameters by the terminating Bluetooth transceiver (524R or 524L) to exchange the Bluetooth parameters, including public and optionally private keys established during initial pairing. Alternatively, the private keys used in pairing may be identical between L and R stations for security and to remove the need for private key exchanges between sidelink transceivers. The sharing of these pairing parameters allows either of the Bluetooth transceivers 524R and 524L to receive and acknowledge Bluetooth packets interchangeably.

The second Bluetooth Device 502L operations in the identical manner as 502R, but in opposite mode of operation, such that device 502L operates in a second mode when device 502R operates in first mode, and vice versa. During a first interval, Bluetooth transceiver 524R is enabled and outputting the R channel to switch 528R, with sidelink transceiver 526R transmitting the remaining audio channel to the other station 502L and with Bluetooth transceiver 524L disabled to reduce power consumption, and 502L receiving the transmitted signal from its sidelink 526L transceiver. During a second interval, the operation reverses, and Bluetooth transceiver 524L is enabled (with example BLE 526L transmitting the R audio channel to the other station 502R sidelink transceiver 526R), during which time BT transceiver 524R is disabled, the station 502R receiving the transmitted signal from its sidelink transceiver 526R. The controllers 530R and 530L communicate with each other using their respective sidelink station interfaces 526R and 526L to ensure that the Bluetooth receivers 524R and 524L are synchronized with each other for first and second mode such that exactly one Bluetooth transceiver (524R or 524L) is receiving the audio stream from the remote master device (not shown), as well as communicating Bluetooth pairing credentials from the initially pairing transceiver to the other, thereby allowing either to act as a terminating station for the Bluetooth stream from the remote master device. Without careful synchronization, the L and R channels may incur phase or time delays with respect to each other. The controllers 530R and 530L also buffer and synchronize the delivery of audio such that the L and R streams are output 514R and 514L at the same time and without L to R phase delay. This may be done by including timestamps in the data stream sent with the audio stream over the sidelink to ensure the L and R audio as delivered to the earpieces are identically matched in time as in the original codec stream.

Each Bluetooth device 502R and 502L maintain synchronization to the Bluetooth stream, such that renegotiation is not necessary when a master BT transmission is received by either 502R to 502L as a slave device occurs, and the master device is spoofed into recognizing the same single Bluetooth device 502R and 502L during transitions from first mode to second mode. Whichever Bluetooth transceiver of a station is enabled during its respective mode to receive the BT frames (502R during first mode and 502L during second mode) responds as if they were a single BT station, as only one BT system responds at a time, and each are possessed of the pairing credentials and timeslot information. In this manner, the communications from BT master to BT slave can be performed in a series of alternating bursts, with one station receiving as a fully featured Bluetooth device a burst of frames and forwarding the remote channel audio to the remote earpiece using a sidelink such as BLE transceivers, and then the roles reverse for each station or device 502L and 502R during a subsequent interval. In this manner, the inherently asymmetrical battery load (and battery lifetime) of a single mode of operation of the prior art can be equalized between the L and R channel.

Figure 6A:
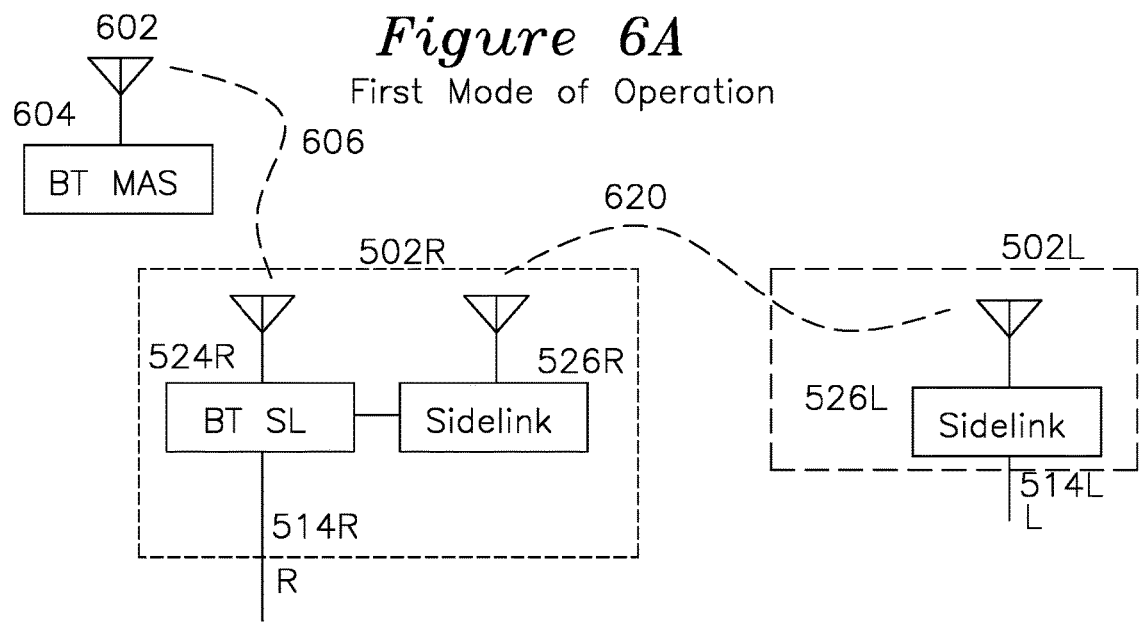
FIGS. 6A and 6B are block diagrams for the present invention showing data connections during a first and second mode of operation.
Figure 6B:
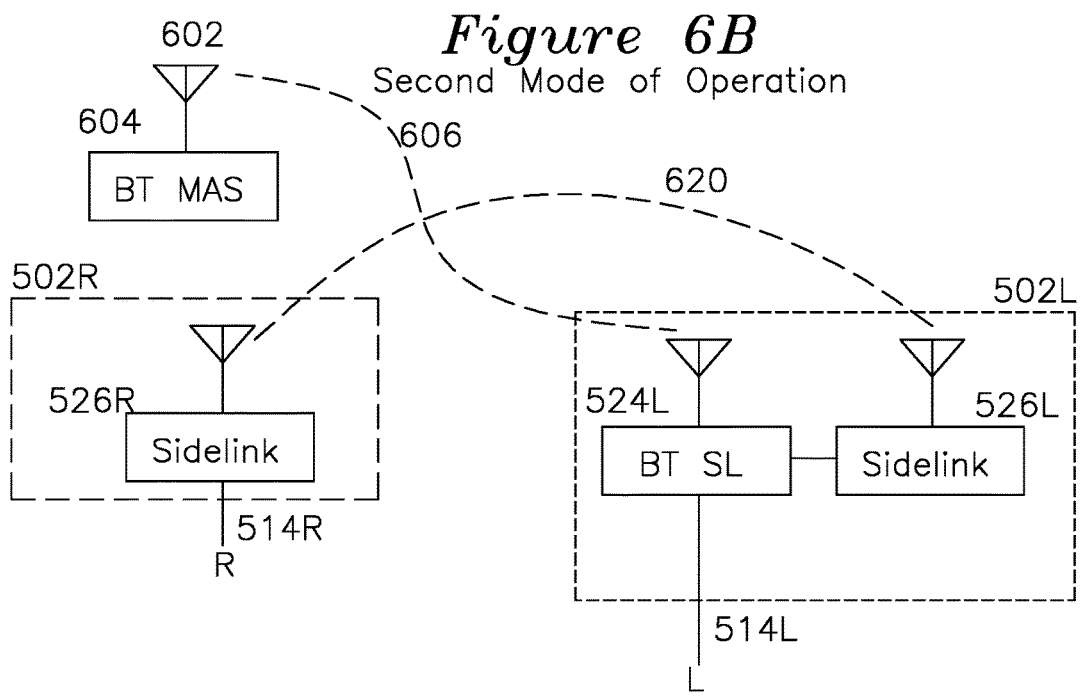

FIG. 6A shows a top level of operation of the system during a first mode, and FIG. 6B shows the operation during a second mode. Typically, the first mode and second mode alternate in substantially uniform intervals of time. Substantially uniform or substantially equal are understood in the present application to be intervals of time resulting in battery drain less than 20% of equal to each other, such that the L and R batteries exhaust at the same time. First mode FIG. 6A shows a Bluetooth master 604 such as a Bluetooth watch streaming music, or a mobile phone streaming music, with the Bluetooth stream 606 received and acknowledged by first BT device 524R, sending the R channel to output 514R, and the Left channel being directed via stream 620 to sidelink device 526R. During the interval of the first mode, first device 502R consumes 4 ma of current, and second device 502L consumes 1 ma.

FIG. 6B shows operation during the second mode of operation, where the Bluetooth stream 606 is received and acknowledged by second device 502L using Bluetooth transceiver 524L, which uses its sidelink transceiver 526L to send the R output 620 to sidelink transceiver 502R which outputs it at 514R, with 502R drawing 1 ma of power while 502L draws 4 ma (3 ma for BT transceiver 524L and 1 ma for sidelink transceiver 526L).

Figure 7:
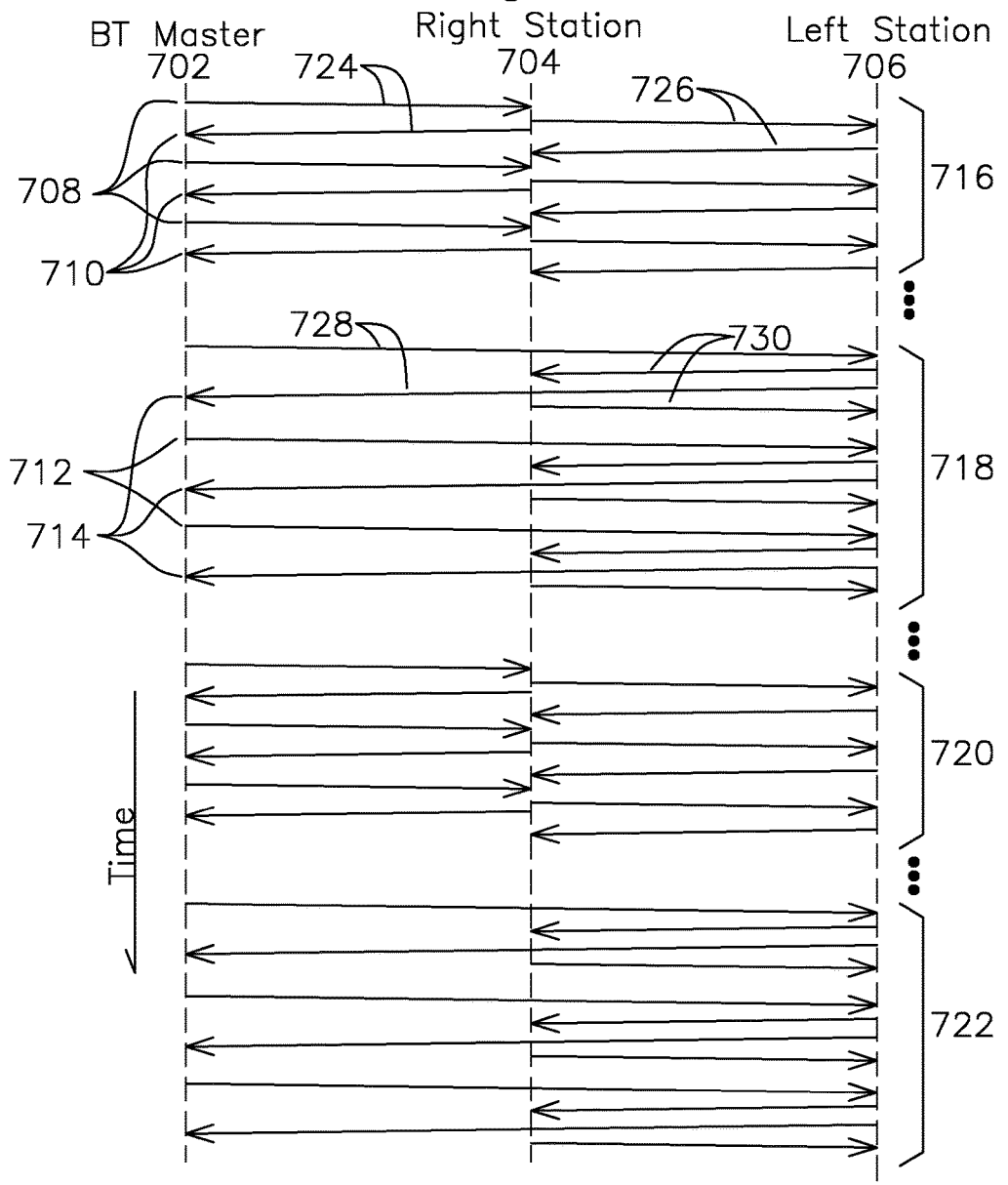
FIG. 7 is a time progression diagram for delivery of packets according to the present invention.

FIG. 7 shows a timing sequence for canonical data transmission, where a Bluetooth master such as a tablet, watch, or mobile phone 702 operates as BT master 604 of FIG. 6, Right station 704 operates as 502R of FIG. 6A, and Left station 706 operates as 502L of FIG. 6A. During a first mode of operation for the sequence 716 and 720, the tablet 702 transmits audio data for both channels to Right station 705, which acks the data if necessary, shown as the data/acq pair 724. Right station 704 uses the sidelink transceiver to forward the L audio to Left station 706, which acks each data packet if required, shown as the pair 726. The response acknowledgement of 726 and 730 of the sidelink transceiver and 724 and 728 of the Bluetooth transceiver is shown for completeness, as other Bluetooth protocols may not provide acknowledgement for received data, and the sidelink protocol may ack, simply receive unicast data without acknowledgement, or in the case of certain near field induction protocols, may transmit continuously as modulated low frequency RF. After an interval of time 716, such as at the end of the duration of an audio track as indicated by the AVRCP protocol/profile, the Right station 704 changes from first mode of operation to second mode of operation, and Left station 706 changes from second mode of operation to first mode of operation. During time interval 718, the master 702 Bluetooth packets are received by Left station 706, which separates the Left audio stream and sends the Right audio stream over the sidelink transceiver to Right station 704. A pair of data/ack packets is shown as 728 from Master BT station 702 to Left station 706, which results in the Right audio being extracted and sent via the sidelink channel to Right station 704, where the data/ack pair is shown as 730.

Figure 8:
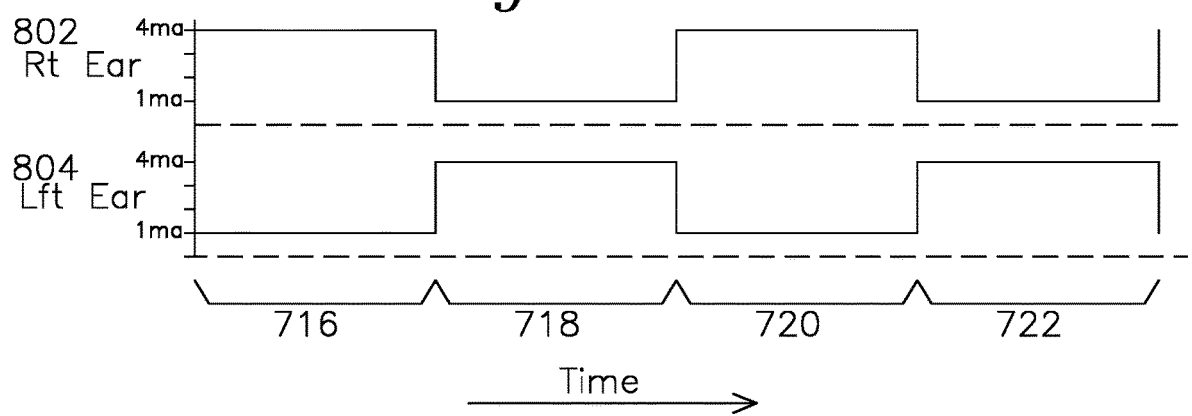
FIG. 8 shows waveforms of power consumption for the example of FIG. 7.

FIG. 8 shows a plot of power consumption during operation, intervals 716 and 720 represent Right station and Left station power consumption for the first mode where Right Ear 802 receiver is running Bluetooth plus a sidelink protocol such as BLE physical encoding, and Left Ear 804 is running on the sidelink protocol only. The present examples are for the case where a Bluetooth transceiver consumes 3 ma (receiving both L and R streams, and transmitting L or R only) and a BLE transceiver consumes 1 ma (receiving only L or R stream), and are shown only for illustrative purposes. The time allocations for each of first and second mode of operation may vary greatly, it is preferable that the duty cycle be 50% in each of first and second mode of operation over the charge life of a battery, but preferably the first and second cumulative interval times are adjusted so that the battery consumption from each Left and Right earpiece are equalized over each battery state of charge, so that both stations respective battery preferably exhausts at the same moment in time. This may be accomplished by changing modes between audio tracks, or during pauses in the audio stream, or at times when the rate of Bluetooth packet reception from the master is reduced. In another example of the invention, the Left and Right earpieces communicate with each other as to the relative state of charge, and adjust the duty cycle 716/720 to 718/722 such that the available charge in Left and Right earpieces is taken to the end of the battery capability for Left and Right earpieces at the same time.

Figure 9A:
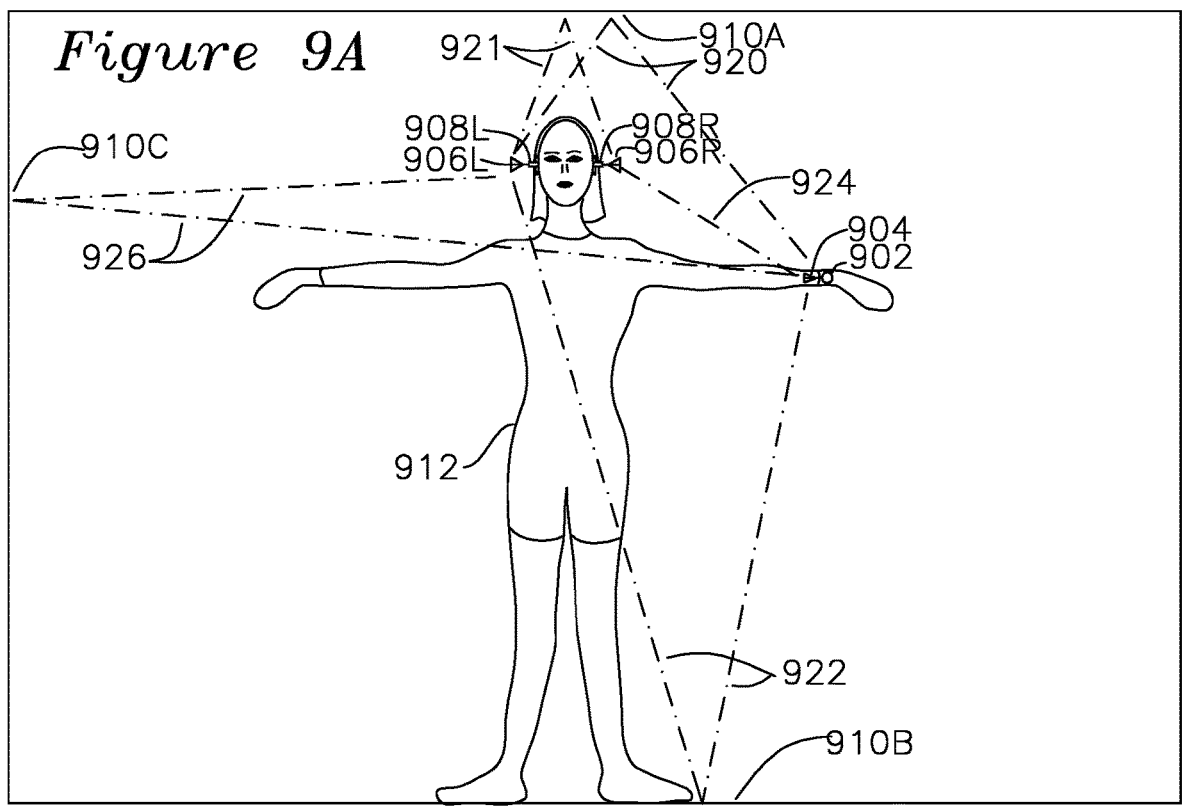
FIGS. 9A and 9B show a diagram of a person with a smart watch delivering wireless audio content to an R and L earpiece in an interior and exterior setting.
Figure 9B:
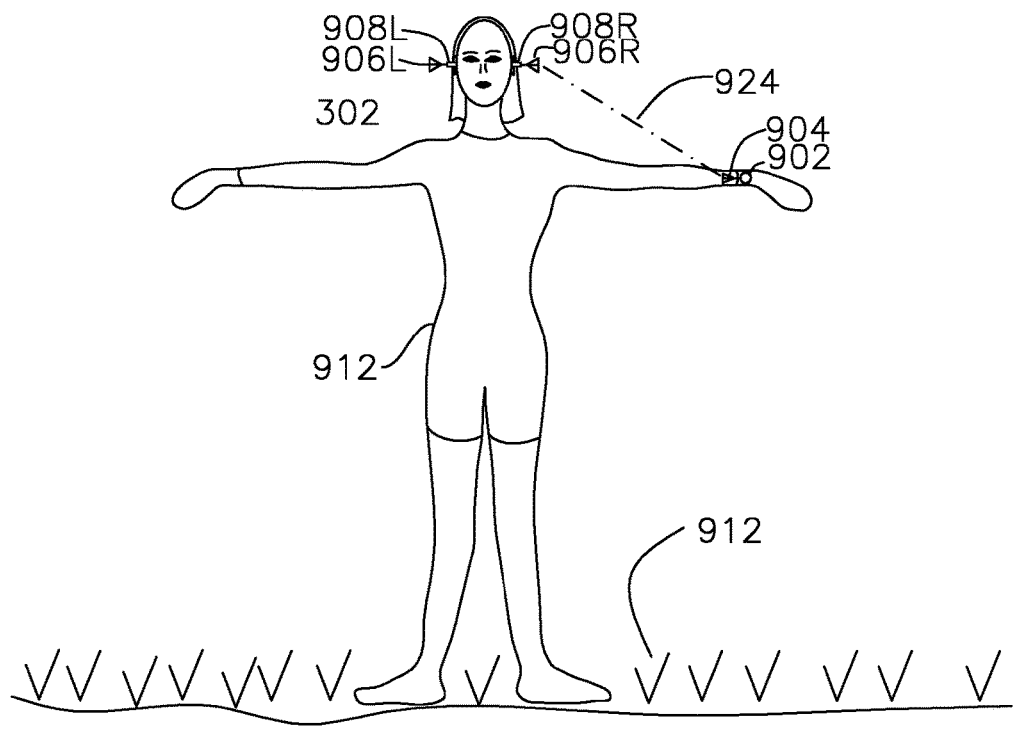

FIGS. 9A and 9B show additional embodiments of the invention for a problem that occurs in the outdoor usage case of FIG. 9B compared to the indoor case of FIG. 9A where the RF couples from a wearable BT master such as a watch 904 with antenna 902 to the earpieces 908L and 908R with respective antennas 906L and 906R. Alternative embodiments of the present invention may address a problem which occurs with a wearable Bluetooth device (shown as watch 904) streaming data to earpieces 908L/908R. In the indoor case of FIG. 9A, there exists a direct RF path 924 from BT master 904 to antenna 906R. Several multipath reflections from master 904 to 908L are available, including path 920 with reflective surface 910A, path 922 with reflective surface 910B, and path 926 with reflective surface 910C. Similarly, many indoor reflective paths 921 (including multipath reflections) exist between earpiece 908L and 908R for use by the sidelink transceivers. Any of the surrounding reflective surfaces 910A, 910B, or 910C may provide a single or multi-reflection path from Bluetooth master 904 to earpieces 908R and 908L, or between 908R and 908L.

Figures 10, 11:
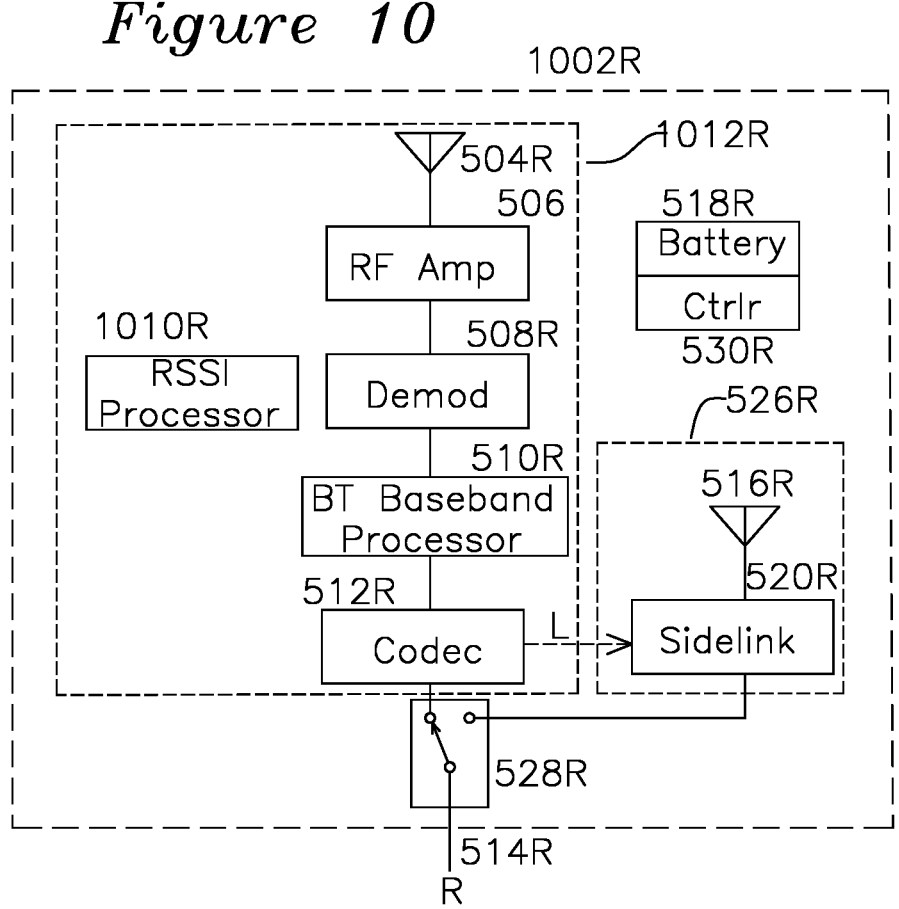
FIG. 10 shows a block diagram of a wireless processor with a Receive Signal Strength Indicator (RSSI) processor.
FIG. 11 is a list of RSSI values and example modes for the receiver of FIG. 10.

The outdoor coupling shown in FIG. 9B is more challenging, as there are not multi-path couplings available for RF, although the coupling from master 904 to antenna 906R is unchanged from the indoor case of FIG. 9A. Because the earpieces are positioned in the ear canal, and the RF-conductive pinnae of the ear surround the earpieces, coupling from one earpiece antenna 906R to 906L is problematic, and from master 902 antenna 904 to far earpiece 908L antenna 906L is even more problematic, with typical path attenuations in excess of 100 dB, although the shorter link from 906R to 906L may still be usable for RF communications such as BLE. In the case of the master being a watch is on a wearer's L or R wrist, it may occur that a Bluetooth earpiece 908R with antenna 906R has a direct coupling path to the Bluetooth watch master 902 with antenna 905 and has a stronger Received Signal Strength Indicator (RSSI) from the watch 902/904 than the earpiece 908L with antenna 906L on the opposite side of the head from the watch 902/904. RSSI may be measured and stored using any prior art method of signal strength at an antenna, and in FIG. 11 is shown with the signal strength unit dBm, which is the absolute signal strength in decibels compared to 1 milliwatt (1 mw). The earpiece position with respect to the watch is typically not a configured earpiece parameter, and may change over time of with different wearers or positions in the outdoor environment (reflective surface vs absorptive surface for RF). It is desirable for the system of FIG. 5 to adaptively select mode 1 for the earpiece with the strongest signal and select mode 2 for the earpiece with the weakest signal, and optionally to use an alternative sidelink transmission method (such as near field induction) rather than the physical layer of BLE with lower power consumption but greater attenuation from 906R to 906L. The stronger signal link also provides reduced power consumption by allowing faster data rates, reducing transmit and receive times and resumption of a sleep state in the associated transmitter and receiver.

FIG. 10 shows a modified version of FIG. 5, with Bluetooth transceiver 1012R with RSSI processor 1010R which maintains at least one pair of RSSI readings for the local receiver (1012R as shown, such as the position of 908R of FIG. 9B) and the remote receiver (1012L not shown, such as in the position of 908L of FIG. 9A), each RSSI for the Bluetooth signal strength with respect to the Bluetooth master 902/904.

FIG. 11 shows example RSSI measurements as may be maintained by the RSSI processor 1010R, where the remote RSSI measurement from the other station 1002L (not shown) is transmitted to the local station (1002R in this example) using a BLE interface (526R in this example), and vice versa so that both earpieces 1002R and 1002L (not shown) have the values of the RSSI table of FIG. 11. In this manner, each device 1002R and 1002L (not shown) is able to examine its respective RSSI processor table 1010R and 1010L to determine which station should switch to the first mode for reception of BT master signal based on strongest comparative RSSI to master station, and which station should be in second mode based on weaker comparative RSSI. In this manner, the L and R Bluetooth transceivers 1012R and 1012L may determine which earpiece should operate to terminate the BT signal from master watch 902 of FIG. 9, adaptively changing which station terminates the BT master as needed by spoofing each other as a single station response for each data exchange or group of data exchanges. Left and Right earpieces 908L and 908R typically have a uniform attenuation when transmitting in either direction, and also typically less attenuation than from the master to far earpiece of the previous example. In one measurement, the link budget may be 100 dB from transmit antenna to receive antenna for reliable operation, and in the example, the link from antenna 904 to near earpiece antenna 906R is in the range −35 dB to −85 dB, well within link budget, but the link loss from master antenna 904 to earpiece antenna 906L may approach or exceed 110 dB, so that earpiece 908L is unable to function. Alternatively, using BLE physical layer modulation (without BT stack or retransmission protocols), the path loss from 906R to 906L may be less than 90 dB or above an RSSI threshold required for a reliable link, and sufficient for reliable operation. In one example of the invention, the earpiece with strongest RSSI is used for the Bluetooth termination to the master, and the earpiece with the weaker RSSI to the master becomes the sidelink receiver from the station terminating the Bluetooth signal, as long as the earpiece with the weakest RSSI is below the RSSI threshold required for a reliable link. In this manner, the system may operate to cause the batteries in each earpiece to drain uniformly, as long as the RSSI for the weaker earpiece is above the threshold for reliable communication, such as a threshold of −90 dbm, or a threshold between −80 dbm and −95 dbm. The present invention of FIG. 10 thereby provides flexibility in where the Bluetooth master is positioned on the body, as well as changes in environment (moving outdoors to indoors), where the power consumption equalization previously described may resume. In another example, the device may operate seamlessly between a battery life equalizing mode, where the first mode and second mode alternate with a duty cycle which equalizes the load to remaining battery life for each battery, to cause the first earpiece battery and second earpiece battery to reach exhaustion at the same time, and when it is not possible to operate in this preferred mode because the weakest RSSI is below the threshold required for reliable communications, the device may operate in a safety mode to preferably link the earpiece with strongest RSSI to the BT master, reverting to battery life equalizing mode when the earpiece with the weakest RSSI is above the threshold required for reliable communications.

Figure 12:
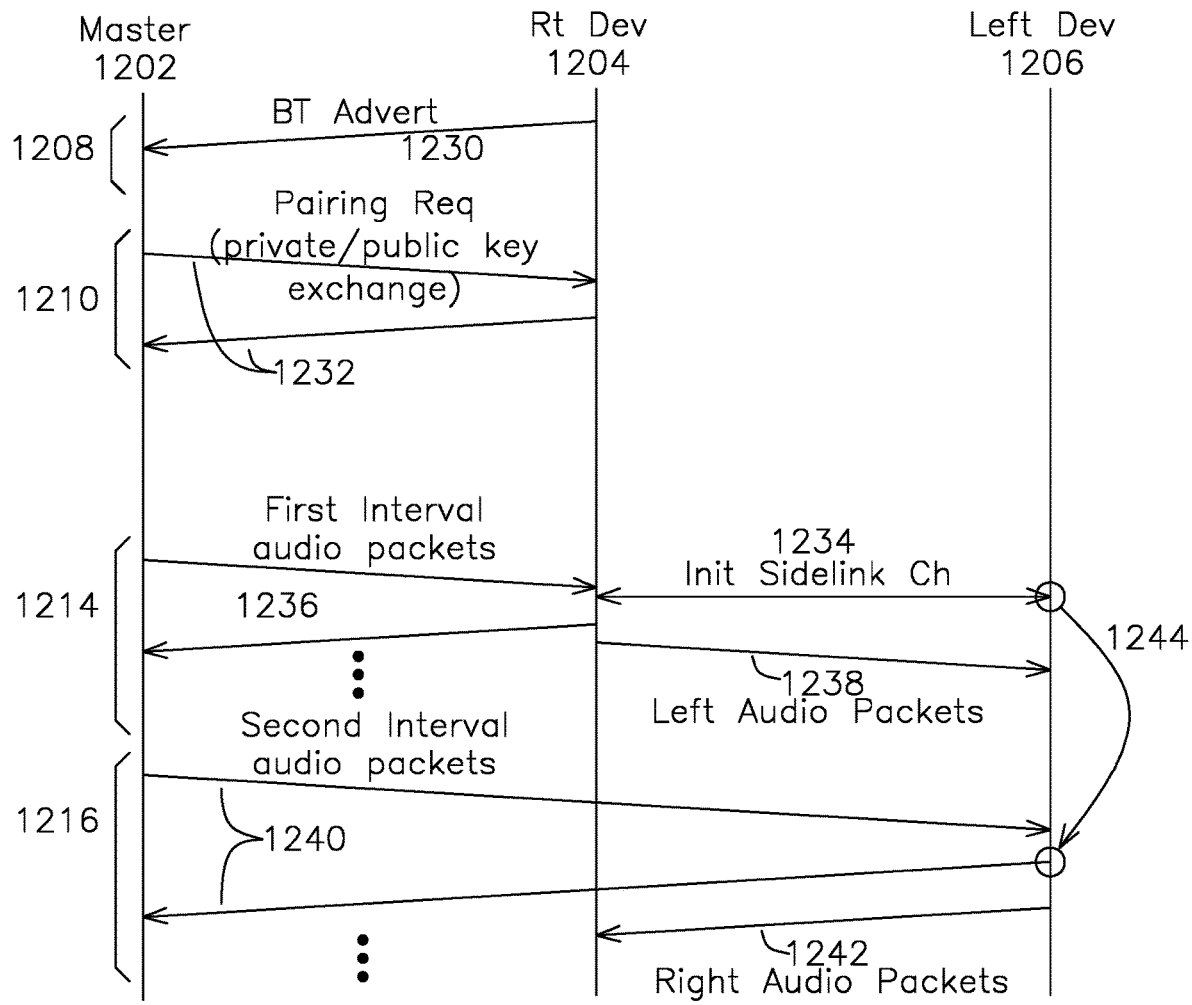
FIG. 12 shows a time sequence diagram of Bluetooth connection and sharing of Bluetooth credentials for use by both Left and Right BT devices.

FIG. 12 shows an example Bluetooth session according to an example of the present invention. During a first pairing interval 1208, Master device 1202 is in a scanning mode (also known as inquiry mode) and receives pairing advertisements (also known as paging) 1230 from one of the BT slave devices (shown as Right device 1204). Since Right and Left devices 1206 are in communication with each other using the sidelink transceivers, either device may initiate the Bluetooth advertisement using its BT transceiver, such as on the basis of best signal strength from the BT master, as was indicated in FIGS. 10 and 11, or any other mechanism providing advertisements for pairing. During the pairing interval 1210, public and private keys are exchanged and the pairing is complete. In one example of the invention, the Right device 1204 and Left device 1206 have identical private keys which are unique from any other private keys, allowing each device to share pairing credentials from a single public key during the pairing interval 1210 and either earpiece initiate a connection without other parameters. During the initialization of the sidelink channel 1234, the pairing device such as 1204 is also able to share the Bluetooth pairing credentials to the other device such as 1206 if needed. During a first mode interval 1214 the Right device 1204 receives L and R audio streams, and transmits the L audio stream 1238 as was previously described. In a subsequent second mode interval 1216, the Left device 1206 receives and acknowledges packets shown as data/ack 1240, which continues during interval 1216. In one example, the Left device 1206 is able to respond using the pairing credentials shown by 1244. In another example, the sideband channel initialization 1234 is not necessary, and the two BT transceivers are able to communicate with the BT master using local keys, without the key exchange step 1234. Other exchanges and updates of pairing credentials or Bluetooth link parameters may be performed at other times as required.

Figure 13:
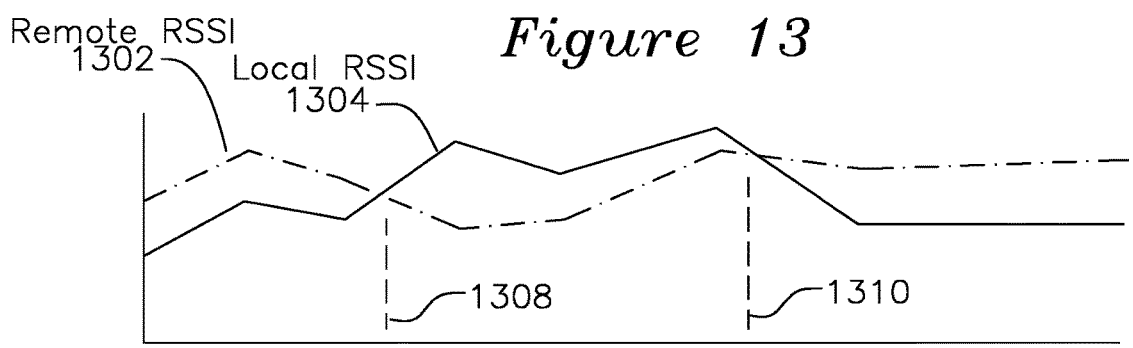
FIG. 13 shows a plot of signal strength and first and second modes of a first and second station based on RSSI.

FIG. 13 shows a time diagram with respect to a Local station, where the "local RSSI" 1304 (signal strength of the BT master measured by a given local BT transceiver) and "Remote RSSI" 1302 (signal strength of the BT master as reported by the remote BT transceiver and transmitted to the local station) are shown along with the first and second mode configuration for the local and remote stations. At point in time 1308, the local station RSSI becomes stronger, and the local station takes over as terminating the Bluetooth connection from the master in the first mode as previously described, and at time 1310, the remote device switches to operating in the first mode.

Figure 14:
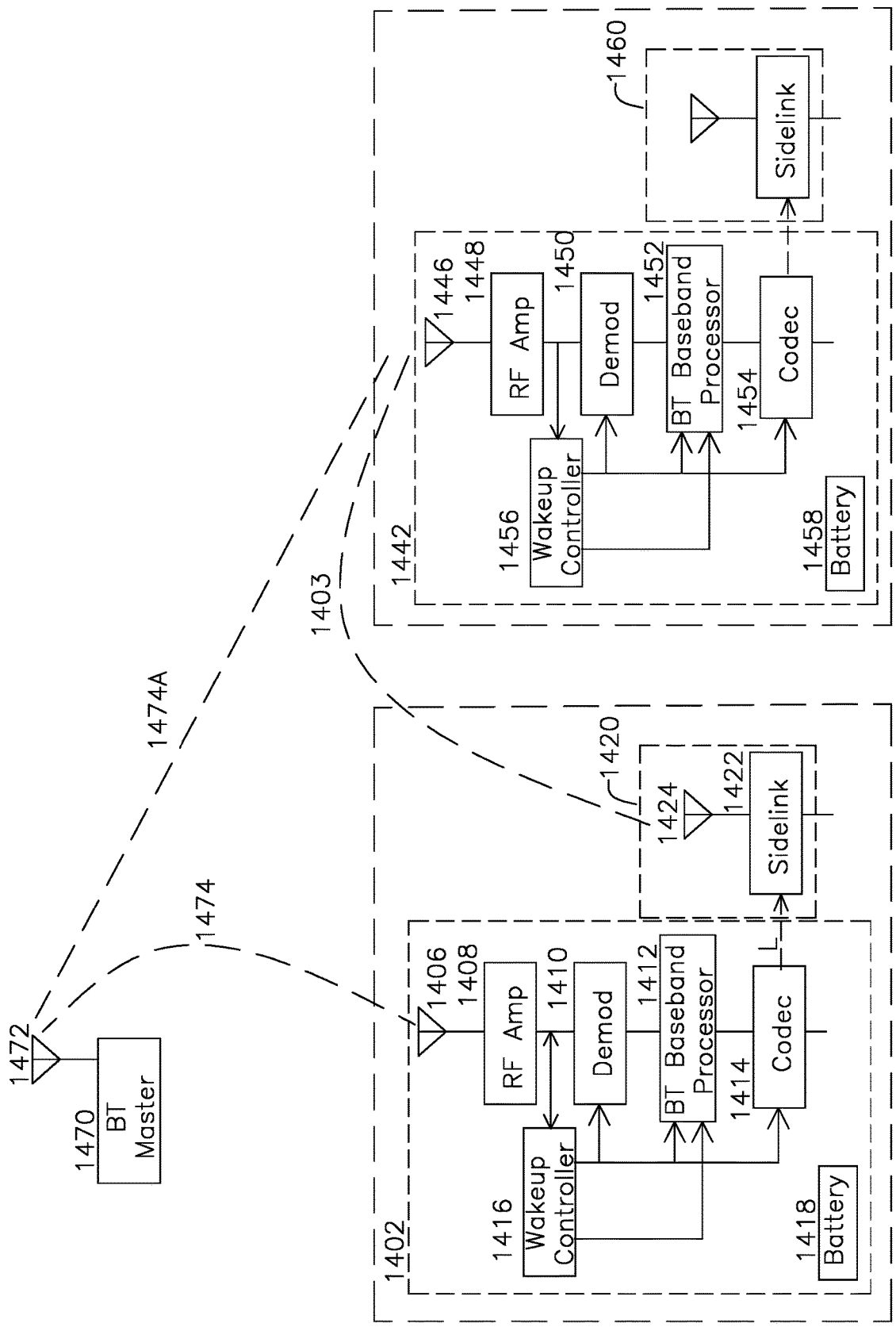
FIG. 14 shows a block diagram for a Bluetooth system with a wakeup mechanism and sidelink for passing Bluetooth link parameters.

FIG. 14 shows another aspect of the invention related to problem of initial pairing of the earpieces to a master, or alternatively, to synchronization of the earpieces to each other using BLE which requires an initial pairing. The latency and delay associate with pairing and re-establishment of an existing Bluetooth connection is related to the frequency hopping sequence of Bluetooth used in the pairing and connection protocols. Bluetooth implements frequency hopping at 1600 hops per second with a corresponding time slot length of 625 μs, where a master may occupy one or more contiguous BT time slots and a slave typically acks in a single timeslot. In the master scan/inquiry process, Bluetooth devices hop through a set of 32 common frequencies. The potential master in an INQUIRY STATE breaks this set into two 16-hop trains, A and B. It hops through the frequencies in each train at twice the normal rate, repeating the train at least 256 times (2.56 s) before switching to the next train. During this process, the device is sending inquiry packets on every frequency. To find all devices in an error-free environment, the length of time a device spends in inquiry, must consist of at least three train switches of 10.24 s. It is desired to shorten the connection time.

FIG. 14 shows a block diagram of an example BT master 1470 which is pairing to an example BT first slave 1402, using a typical pairing sequence shown in FIG. 15. During an advertisement interval 1506, the first slave device such as 1402 sends pairing advertisements on incremental channels, as shown by the sequence 1512. After a variable interval of scan time by the BT master, the BT master 1504 receives an advertisement leading to a pairing request 1512 on an observed channel and acknowledges the pairing request with connection request 1514 on one of the advertised channels, which includes exchanges of public and private keys during connection interval 1508. This is followed by a data exchange interval 1510 where the Master transmits frames to the slave on one or more regular slotted time intervals, and the slave responds with any acknowledgements or data it may have to transmit, as shown by the arrows between master 1504 and slave 1 1502 in FIG. 15A. As shown in event 1210 of FIG. 12, during the establishment of the connection, the slave device 1402 of FIG. 14 is possessed of the pairing credentials to pair with the Bluetooth master 1470.

One aspect of Bluetooth pairing is that there is initially no synchronization between a slave device, which transmits a sequence of advertisement frames on incrementing channels during a matching scanning interval by the master, wherein the master is listening on a sequence of channels until the advertising device and scanning master find themselves on the same channel and the advertisement is received by the master. Because of the long latency of the pairing protocol, and the power consumed during the pairing protocol, an objective of the present invention is to allow the second slave 1442 of FIG. 14 to join in receiving frames from the master 1470 as early as possible and without consuming power during the comparatively long pairing sequence, or by receiving the credentials over sidelink link 1403 as was described previously in FIG. 12. In the present aspect of the invention, after establishment of a Bluetooth connection between Bluetooth master 1470 and first slave 1402 using the typical pairing sequence, the wakeup controller 1416 has the Bluetooth credentials (private and public key) necessary for any other station to substitute for first slave 1402. In one aspect of the invention, the sidelink transceiver 1420 under control of the wakeup controller transmits an on/off keying (OOK) sequence that contains a wakeup pattern during a first interval of time, the OOK pattern being formed of uniform length packets and uniform length packets to represent each 1 and 0 value, respectively, or by keying a carrier on and off. The wakeup controller 1456 of second slave 1442 receiving this sequence compares the incoming wakeup sequence against a wakeup pattern, such as by cross correlation of the incoming OOK pattern against the wakeup pattern, and when the cross correlation is above a threshold such as 80% or 90% of a complete match, the wakeup controller powers up the functions of the station 1442 for full functionality and readiness to receive and respond to BT master data packets. By synchronizing the transmission of the Bluetooth public/private key pair with a future expected transmit window of the Bluetooth master 1470, the second slave 1442 may wakeup with the public/private key pair of the first slave 1402 and directly engage in data communications with the BT master 1470 in place of the first slave 1402.

FIG. 15A was previously described showing the advertisement interval 1505 matching the scanning interval 1506, followed by connection interval 1508, and data exchange interval 1516. FIG. 15B shows the first slave 1550 using sidelink transceiver 1420 of FIG. 14 to transmit a wakeup sequence 1554, which results in the second slave 1552 waking up, enabling power to its sidelink transceiver, and either receiving the Bluetooth parameters 1556 transmitted by the first slave 1550, or beginning communications directly with the BT master in interval 1564. Alternatively, the Bluetooth communication parameter transfer 1556 may be transmitted by OOK methods to transfer the Bluetooth connection parameters from first slave 1550 to second slave 1552 if necessary. The Bluetooth parameters are either pre-shared or known by both slave stations so that the second slave 1552 can spoof the master 1550 by replying to Bluetooth packets from the master in place of the first slave 1550 as shown in the exchange 1562 and 1564. The second slave wakeup controller 1456 samples the incoming RF and determines when to power up the rest of the receiver (mixers, baseband processor, anything other than the extremely low power energy detection and sampling circuit sampling the OOK (or alternatively fixed length packets modulated at RF for 1 and the absence of RF for 0). The wakeup sequence 1554 matches the internal wakeup key of wakeup controller 1456 which is sampling the RF envelope, and results in the wakeup controller 1456 powering up with the Bluetooth parameters required for each station to respond seamlessly to the BT master 1474A or 1474. The parameters used by connection 1474 of FIG. 14 may be transmitted by the first slave using its sidelink transceiver 1420 monitored by second slave 1442 over channel 1403. In one example of the invention, the identical private keys of the first slave and second slave allow the private/public key pair 1554 used by the first slave 1402 in communicating with master 1470 while maintaining the secrecy of the private key during the connection establishment of the sidelink transceiver 1420. The state of the master 1470 Bluetooth connection is either active or inactive, and may be provided by slave 1402 in the optional parameter transfer 1556 along with timing parameters that indicate when the anchor points of the Bluetooth frame used by the slave to synchronize time slots and frequency hopping pattern. For an inactive connection, upon wakeup, one of the sidelink parameters 1556 identifies anchor points and timing slots to the second slave. For an active connection, the master 1504 transmits data 1562 and second slave 1552 transmits data such as acknowledgements 1564, each in their respective time slots as defined by the master 1504 and the Bluetooth anchor points transmitted by the BT master, or as received by slave 1442 as Bluetooth connection parameters.

Figure 16:
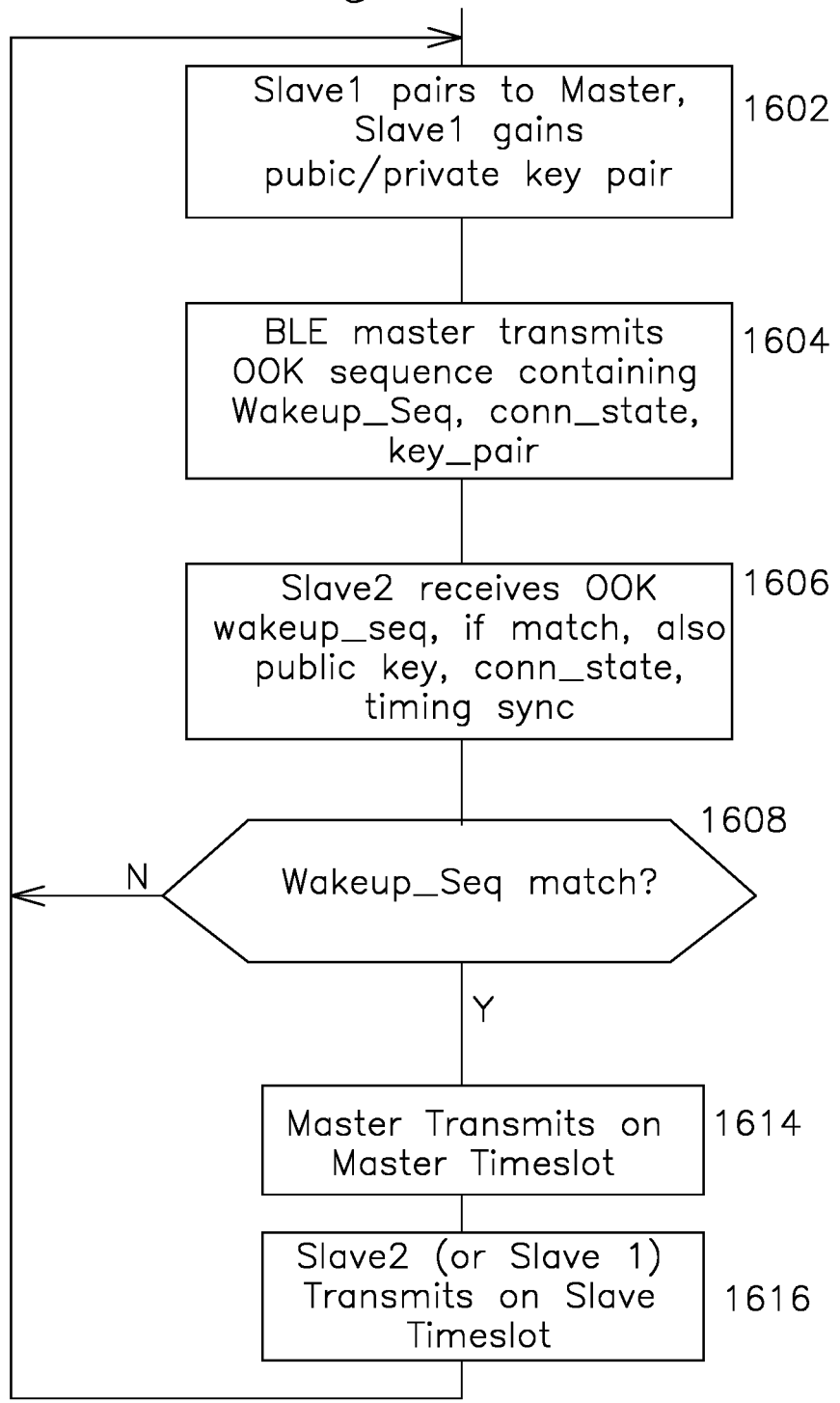
FIG. 16 shows an example flowchart for operation of the invention of FIG. 14.

FIG. 16 shows a simplified flowchart for the present invention. In step 1602, a first slave pairs to a master, during which time the first slave acquires the link parameters for slave 1 to the master, which includes connection state, public private key pair, timing information to next BT anchor point and other parameters needed by a second slave responding to the master as if it were the first slave device in a spoofing manner. In step 1604, an example second Bluetooth master serially transmits a wakeup sequence, connection state (no connection, active, inactive), pairing parameters including public/private key pair of step 1602, and any other Bluetooth parameters required for directly connecting to the master. In step 1606, the second slave receives the OOK wakeup sequence, followed by the public/private key pair and any other Bluetooth parameters provided. In step 1608, if the wakeup sequence matches, the master transmits on master timeslots to the second slave and the second slave transmits on corresponding slave timeslots, exactly as the first slave device would do. In this manner, responses from the first and second slave are treated identically by the master device, thereby allowing an extremely low power pairing process compared to the prior art pairing sequence of Bluetooth.

In another example of the invention, the wakeup pattern is a hierarchical wakeup pattern comprising at least a first and second sequence, the first sequence having a lower bit rate than the second sequence, and the first sequence using fewer bits than provide a reliable indication of wakeup, with the second sequence greatly improving the reliability while reducing the power consumption of the wakeup event. An example hierarchical wakeup system and pattern is described in U.S. patent application Ser. No. 13/783,785 filed Mar. 2, 2017, and in Ser. No. 15/811,690 filed Nov. 14, 2017, both of which are incorporated in their entirety by reference.

The present examples are provided for illustrative purposes only, and are not intended to limit the invention to only the embodiments shown.

We claim:

1. A method for communication between:
a Bluetooth master transmitting a first channel data stream and a second channel data stream over a single Bluetooth connection;
a first slave device having a Bluetooth transceiver, a sidelink transceiver, and a wakeup processor;
a second slave device having a wakeup processor, a Bluetooth transceiver and a sidelink transceiver, the first slave device Bluetooth transceiver paired to the Bluetooth master and receiving the first channel stream and the second channel stream, the first slave device forwarding the second channel stream to the first slave device sidelink transceiver, the second slave device Bluetooth transceiver in a sleep state while the second slave device sidelink transceiver receives the second channel stream, the method comprising:
upon communication of a change event from the Bluetooth master to the first slave device, the first slave device sending to the second slave device a wakeup pattern formed from on/off keying (OOK) of a transmitter;
the wakeup processor of the second slave device, upon receipt of a wakeup pattern matching an internal template, thereafter receiving Bluetooth connection parameters from the second slave device sidelink transceiver transmitted by the first slave device, and applying the Bluetooth connection parameters to the second slave device Bluetooth transceiver; and,
the Bluetooth transceiver of the first slave device thereafter powering down, the second slave device Bluetooth transceiver receiving the first channel data stream and second channel data stream, the second slave device forwarding the first channel data stream to the first slave device sidelink transceiver.

2. The method of claim 1 where the first sidelink transceiver and the second sidelink transceiver have a common private key.

3. The method of claim 1 where the wakeup pattern is sent by OOK and the Bluetooth parameters are sent using Bluetooth.

4. The method of claim 1 where the wakeup pattern and the Bluetooth parameters are sent using OOK.

5. The method of claim 1 where the second slave device Bluetooth transceiver responds to the master in a spoofing manner using Bluetooth parameters from the first slave Bluetooth parameters in place of the first slave device Bluetooth transceiver.

6. The method of claim 1 where at least one of the wakeup pattern or the transmission of Bluetooth parameters indicates anchor points for the second slave device Bluetooth transceiver to establish a transmit window and a receive window.

7. The method of claim 1 where the wakeup pattern is a series of on and off keying at a fixed rate.

8. The method of claim 1 where the OOK sequence is followed by the transmission of Bluetooth parameters from the first slave device paired to the Bluetooth master.

9. The method of claim 1 where the wakeup pattern changes bitrate over a series of intervals.

10. The method of claim 1 where the Bluetooth parameters are sent from the first sidelink processor to the second sidelink processor using private/public key encryption.

11. A method for communication between a Bluetooth master transmitting a first data stream and a second data stream over a single connection to a remote station, the remote station being at least one of a first slave device comprising a Bluetooth transceiver and a sidelink transceiver and a second slave device comprising a Bluetooth transceiver and a sidelink transceiver, the method alternating between a first interval of time and a second interval of time, the method comprising:
during the first interval of time, the first slave device Bluetooth transceiver receiving the first data stream and the second data stream, the first slave device sidelink transmitter transmitting the second stream of data to the second slave device sidelink transceiver, the second slave device Bluetooth transceiver powered down during the first interval of time;
during the second interval of time, the second slave device Bluetooth transceiver receiving the first data stream and the second data stream, the second slave device sidelink transmitter transmitting the first stream of data to the first slave device sidelink transceiver, the first slave device Bluetooth transceiver powered down during the second interval of time;
between the first interval of time and the second interval of time, the first slave device sending an On-Off-Keying (OOK) wakeup pattern to the second slave device, the second slave device, upon receipt of the OOK wakeup pattern, enabling the second slave device Bluetooth transceiver and receiving Bluetooth parameters used by the first slave device Bluetooth transceiver, the first Bluetooth transceiver thereafter powering down; and,
between the second interval of time and the first interval of time, the second slave device sending an On-Off-Keying (OOK) wakeup pattern to the first slave device, the first slave device, upon receipt of the OOK wakeup pattern, enabling the first slave device Bluetooth transceiver and receiving Bluetooth parameters used by the second slave device Bluetooth transceiver, the second Bluetooth transceiver thereafter powering down.

12. The method of claim 11 where the first sidelink transceiver and the second sidelink transceiver have a same private key.

13. The method of claim 11 where the wakeup pattern is sent by OOK and the Bluetooth parameters are sent using Bluetooth.

14. The method of claim 11 where the wakeup pattern and the Bluetooth parameters are sent using OOK.

15. The method of claim 11 where the second slave device Bluetooth transceiver responds to the master in a spoofing manner in place of the first slave device Bluetooth transceiver.

16. The method of claim 11 where at least one wakeup pattern or transmission of Bluetooth parameters indicates anchor points for the second slave device Bluetooth transceiver to establish a transmit window and a receive window.

17. The method of claim 11 where the wakeup pattern is a series of on and off keying at a fixed rate.

18. The method of claim 11 where the OOK sequence is followed by the transmission of Bluetooth parameters from the first slave device paired to the Bluetooth master.

19. The method of claim 11 where the wakeup pattern changes bitrate over a series of intervals.

20. A communication device comprising a Bluetooth transceiver, a sidelink transceiver, and a wakeup transceiver, the Bluetooth transceiver operative in a first mode, a second mode, a third mode, and a fourth mode;
  in the first mode, the Bluetooth transceiver receiving at least two streams of data from a single Bluetooth connection, the Bluetooth transceiver forwarding one of the two streams of data to the sidelink transceiver;
  in the second mode, the Bluetooth transceiver being powered down, the sidelink transceiver receiving one of the streams of data;
  in the third mode, the Bluetooth transceiver transmitting Bluetooth configuration parameters to the sidelink transceiver and thereafter changing to the second mode; and,
  in the fourth mode, the Bluetooth transceiver receiving Bluetooth configuration parameters, powering up the Bluetooth transceiver, applying the Bluetooth configuration parameters to the Bluetooth transceiver, and thereafter changing to the first mode.

* * * * *